UNITED STATES PATENT OFFICE.

JAMES B. GARNER AND HOWARD D. CLAYTON, OF PITTSBURGH, PENNSYLVANIA, ASSIGNORS TO METALS RESEARCH COMPANY, OF NEW YORK, N. Y., A CORPORATION OF MAINE.

MANUFACTURE OF HYDROCHLORIC ACID.

1,220,411.     Specification of Letters Patent.     Patented Mar. 27, 1917.

No Drawing.     Application filed March 4, 1915. Serial No. 12,133.

*To all whom it may concern:*

Be it known that we, JAMES B. GARNER and HOWARD D. CLAYTON, both citizens of the United States, residing, respectively, at Pittsburgh, Allegheny county, State of Pennsylvania, have invented certain new and useful Improvements in Manufacture of Hydrochloric Acid; and we do hereby declare the following to be a full, clear, and exact description of the invention, such as will enable others skilled in the art to which it appertains to make and use the same.

The present invention relates to the manufacture of hydrochloric acid in a commercial way, and is based upon the discovery that hydrogen and chlorin, in the presence of a suitable catalyzer, such as wood charcoal, will react smoothly, quietly, and quantitatively to produce hydrogen chlorid which may then be dissolved in water to produce hydrochloric acid of the desired strength.

In the practice of the invention, the hydrogen and chlorin can be first dried by passing them separately through concentrated sulfuric acid. After drying, they are led in equal volumes into a chamber more or less completely filled with ordinary wood charcoal and so constructed that most of the daylight is excluded.

The chamber containing the charcoal and into which the dry hydrogen and dry chlorin are led in equal volumes is heated to a temperature of 520° C. Under these conditions the gases unite quietly and completely to form hydrogen chlorid. This latter gas passes from the chamber containing the charcoal and is absorbed by water in the usual manner to form the solution commonly called muriatic or hydrochloric acid. The acid can be made in this manner of any desired strength, up to that of a solution saturated for the temperature at which the absorption takes place. The acid produced is free of chlorin.

As hereinbefore indicated, the gases can advantageously be dried before their admission into the chamber containing the catalyzer, for the reason that if moisture is present the reaction proceeds too violently when equal volumes of hydrogen and chlorin are used. We have discovered, however, that the reaction will still proceed smoothly and without explosive violence even though moisture is present provided the hydrogen is used in excess, such as 50 parts of hydrogen by volume to 35 parts of chlorin by volume, or by using any larger excess of hydrogen. In fact, under such conditions, the temperature required for the reaction is about 340° C. All the chlorin combines with the requisite amount of hydrogen to form hydrogen chlorid and the excess of hydrogen passes off with the hydrogen chlorid from the reaction chamber and not being soluble in water may be recovered and again run through the system.

What we claim is:

1. The method of making hydrochloric acid which comprises causing hydrogen and chlorin to react at a temperature of not below about 340° C. in the presence of wood charcoal, moisture being present in the reacting gases and the hydrogen being employed in excess, and recovering the hydrochloric acid thus formed; substantially as described.

2. The method of making hydrochloric acid which comprises causing hydrogen and chlorin in the proportion of about fifty parts of hydrogen by volume to 35 parts of chlorin to react at a temperature of about 340° C. in the presence of wood charcoal, moisture being present in the reacting gases, and dissolving in water the hydrochloric acid thus formed; substantially as described.

3. The method of making hydrochloric acid, which comprises causing hydrogen and chlorin to react in the presence of wood charcoal at a temperature of not below about 340° C., and combining the resulting hydrochloric acid with water to form a solution of hydrochloric acid; substantially as described.

In testimony whereof we affix our signatures, in presence of two witnesses.

JAMES B. GARNER.
HOWARD D. CLAYTON.

Witnesses:
W. J. MOORE,
M. R. HAINER.